US012535773B2

(12) United States Patent
Gigon

(10) Patent No.: US 12,535,773 B2
(45) Date of Patent: Jan. 27, 2026

(54) GRIPPER FOR TIMEPIECE COMPONENT

(71) Applicant: ETA SA MANUFACTURE HORLOGÈRE SUISSE, Grenchen (CH)

(72) Inventor: Basile Gigon, La Chaux-de-Fonds (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 337 days.

(21) Appl. No.: 18/199,563

(22) Filed: May 19, 2023

(65) Prior Publication Data

US 2023/0408981 A1 Dec. 21, 2023

(30) Foreign Application Priority Data

Jun. 21, 2022 (EP) .................................... 22180084

(51) Int. Cl.
*G04D 1/00* (2006.01)

(52) U.S. Cl.
CPC ......... *G04D 1/0092* (2013.01); *G04D 1/0078* (2013.01)

(58) Field of Classification Search
CPC ...... G04D 1/0092; G04D 1/0078; G04D 1/00; G04D 1/005; G04D 1/06; B25J 9/0015; B25J 15/10
See application file for complete search history.

(56) References Cited

U.S. PATENT DOCUMENTS 4,058,302 A * 11/1977 Barrowcliff ............. B25B 5/006 269/97
4,226,144 A * 10/1980 Pliley ....................... G04D 3/06 968/651

(Continued)

FOREIGN PATENT DOCUMENTS

CN 106 975 942 A 7/2017
CN 111708270 A 9/2020

(Continued)

OTHER PUBLICATIONS

Bütefisch et al., "Novel micro-pneumatic actuator for MEMS", Sensors and Actuators A, 2002, vol. 97-98, pp. 638-645 (8 pages total).

(Continued)

*Primary Examiner* — Edwin A. Leon
(74) *Attorney, Agent, or Firm* — Sughrue Mion, PLLC

(57) ABSTRACT

A gripper (100) with radial clamping, provided for a timepiece component, including a plurality of jaws (1) distributed about an axis (D), which defines a direction of insertion and/or of extraction for the timepiece component, and connected to a support (2) of the gripper, each jaw including a bearing surface (10) arranged to ensure a radial contact, relative to the axis, with a counter surface of the component and to be able to apply on this counter surface a radial clamping force, at least one the jaw being radially movable, in relation to the axis, and having an essentially radial travel in relation to the axis (D). Each mobile jaw is connected to the support by a radial elastic return member (3) that extends in a general plane (P) perpendicular to the axis and that is arranged between the mobile jaw and the axis (D).

16 Claims, 6 Drawing Sheets

(56) References Cited

U.S. PATENT DOCUMENTS

| | | | | |
|---|---|---|---|---|
| 11,003,140 | B2 | 5/2021 | Vuille | |
| 2012/0285001 | A1* | 11/2012 | Swan | F16L 5/00 29/559 |
| 2017/0351215 | A1 | 12/2017 | Fukuda | |

FOREIGN PATENT DOCUMENTS

| | | | |
|---|---|---|---|
| EP | 0 497 112 | B1 | 11/1995 |
| EP | 1 454 691 | A1 | 9/2004 |
| EP | 2 366 506 | A2 | 9/2011 |
| EP | 2 366 506 | A3 | 9/2011 |
| EP | 3 639 972 | A1 | 4/2020 |
| JP | 2-59243 | A | 2/1990 |
| JP | 5-119044 | A | 5/1993 |
| JP | 2018-72334 | A | 5/2018 |
| WO | 2016/111177 | A1 | 7/2016 |

OTHER PUBLICATIONS

European Search Report for 22180084.0 dated Dec. 6, 2022.

* cited by examiner

GRIPPER FOR TIMEPIECE COMPONENT

CROSS-REFERENCE TO RELATED APPLICATIONS

This application claims priority to European Patent Application No. 22180084.0 filed Jun. 21, 2022, the entire contents of which are incorporated herein by reference.

TECHNICAL FIELD OF THE INVENTION

The invention relates to the field of manipulating and/or holding timepiece components during their manufacture and/or their assembly, in particular as part of an automated production.

More particularly, the invention relates to a gripper with radial clamping for a timepiece component, including, distributed in an opposite way about an axis defining a direction of insertion and/or of extraction and fixed to a support included in said gripper, a plurality of bearing jaws each including a bearing surface arranged to ensure a radial contact, in the same plane perpendicular to said axis, with a counter surface of a said component, and of which at least one said jaw is essentially radially movable in relation to said axis.

TECHNOLOGICAL BACKGROUND

Manipulating and holding timepiece components, during their manufacture, is always delicate. For a long time, the human hand has been the only reliable solution. The development of automated production has required the implementation of processes ensuring the manipulating or holding functions without deforming the components, in particular in the final phases of their preparation, where the sections of material may be significantly reduced, and where the gripping areas are sometimes difficult to reach. The most widespread industrial solution is the use of the vacuum; however, this effective solution results in a high consumption of energy, and in audible nuisances.

SUMMARY OF THE INVENTION

The invention proposes to develop a gripper for timepiece components, making it possible to manipulate and/or hold a component without using an indent, and requiring no energy other than that already given to the manipulator supporting the gripper for its movements in space. Another aim is to provide a compact and small gripper. Yet another aim is to provide a gripper that is robust and of which the relatively delicate elements are protected effectively.

For this purpose, the invention relates to a gripper with radial clamping, for a timepiece component, including a plurality of jaws distributed about an axis, which defines a direction of insertion and/or of extraction for the timepiece component, and connected to a support of the gripper, each jaw including a bearing surface arranged to ensure a radial contact, relative to said axis, with a counter surface of said component and to be able to apply on this counter surface a radial clamping force, at least one said jaw being radially movable in relation to said axis and having an essentially radial travel in relation to said axis. According to the invention, each mobile jaw is connected to said support by a radial elastic return means that extends in a general plane perpendicular to said axis.

In a preferred embodiment, said radial elastic return means is arranged between the mobile jaw connecting it to said support and said axis.

In an advantageous embodiment, said support also extends in said general plane.

BRIEF DESCRIPTION OF THE FIGURES

The aims, advantages and features of the invention will become more apparent upon reading the following detailed description, with reference to the appended drawings given by way of non-limiting examples, wherein:

FIG. 13 shows the downward approach of the gripper with its jaws in a minimum radial eccentric position, towards a component held on a first fitting;

FIG. 14 shows the relative thrust between the jaws and this component, guided on the insertion surfaces and bearing against the bearing surfaces of the jaws, which are parallel to the axis;

FIG. 15 shows the completion of the vertical travel, with the axial stop positioning of the component in the jaws in a maximum radial eccentric position E2;

FIG. 16 illustrates the release of the gripper, and the separation of the component detached from the first fitting that supported it until then;

FIG. 17 shows the transfer of the gripper towards another production or conveyor station;

FIG. 18 is a detail showing the ejection of the component, under the action of an ejector finger inserted between the support of the gripper and the component, for example in a slot arranged for this purpose in the gripper.

DETAILED DESCRIPTION OF THE INVENTION

Figure 1:
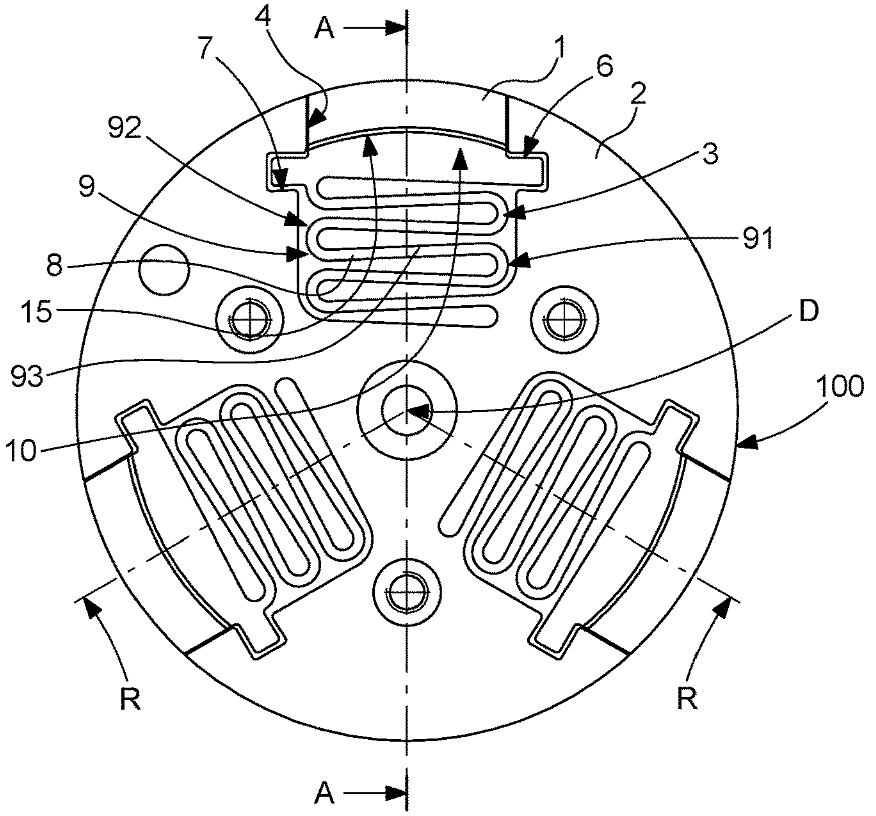
FIG. 1 represents, schematically and in plan view, a gripper according to the invention, with radial clamping, for holding and/or manipulating a timepiece component; this gripper includes a plurality of jaws assembled on a support, in the form of mobile jaws having a mobility in a plane perpendicular to an axis about which extends the component to be held and/or to be manipulated, in which case this axis corresponds to the relative direction of insertion or of extraction between the gripper and this component, the mobility of the mobile jaw being radial in relation to this same axis. This mobile jaw is elastically connected to the support by at least one elastic connection, which, in the specific case of this figure, consists of an elastic return means in the form of a serpent spring; the mobile jaw is movable in a slot of the support, which slot forces it to move in a radial plane passing through the axis. The centrifugal and centripetal travels of the mobile jaw are limited by a stop mechanism, here non-limitingly ensured by the cooperation with a set of posts integral with the mobile jaw in slots integral with the support. In this non-limiting example, the gripper is one-piece.

FIG. 1 shows a schematic representation of a gripper according to the invention, which relates to a gripper 100 with radial clamping for a timepiece component 200.

Here, timepiece component means any basic component or sub-assembly integrated into a timepiece such as a watch, clock or similar. The figures illustrate a non-limiting application of the invention for a component 200 that is a watch blank, a plate, a middle, a case, an oscillating mass, or similar, of dimensions and mass in the order of those of a coin, these particular examples forming rigid elements, on which a reasonable radial gripping force can be applied without giving them a permanent deformation. However, the invention is also designed for gripping other types of timepiece components, particularly components with sections of very thin material, for example balances or similar, for which it will be sufficient to adapt the mechanical features of the gripper, to control the application of gripping forces without leading to a permanent deformation of the component 200.

The gripper 100 with radial clamping, for a timepiece component 200, includes a plurality of jaws 1 distributed about an axis D, which defines a direction of insertion and/or of extraction for the timepiece component, and connected to a support 2 of the gripper. Each jaw 1 includes a bearing surface 10 arranged to ensure a radial contact, relative to said axis, with a counter surface of said timepiece component and to be able to apply on this counter surface a radial clamping force, and therefore a radial pressure on the counter surface, at least one said jaw, advantageously the plurality of jaws being radially movable in relation to said axis D and having an essentially radial travel in relation to this axis.

According to the invention, each mobile jaw 1 is connected to said support 2 by a radial elastic return means 3 that extends in a general plane P perpendicular to said axis D.

According to a preferred variant, each radial elastic return means 3 is arranged between the axis D and the mobile jaw connecting it to said support 2.

According to an advantageous variant, the support 2 also extends in said general plane P.

In a particular variant, at least one mobile jaw 1, and more particularly each mobile jaw 1, has a radial travel that is defined, either by the radial elastic deformability of at least one elastic return means 3 by which this mobile jaw 1 is suspended on the support 2, or by the radial elastic deformability of at least one area with radial elastic deformability 5 included in the support 2 and of which is integral with this mobile jaw 1. The elastic return means 3 may be an attached component such as a spring, or be one piece with the mobile jaw 1 and/or with the support 2.

More particularly, at least one such mobile jaw 1, and preferably each mobile jaw 1, has an essentially, and more particularly strictly, radial travel in relation to the axis D. This essentially radial, and more particularly strictly radial travel is provided in an elastic deformation range of the radial elastic return means 3.

In particular, this strictly radial travel in relation to the axis D is defined by the cooperation between, on the one hand mobile stop surfaces 6 included in the mobile jaw 1, and on the other hand fixed stop surfaces 7 included in the support 2.

Figure 11:
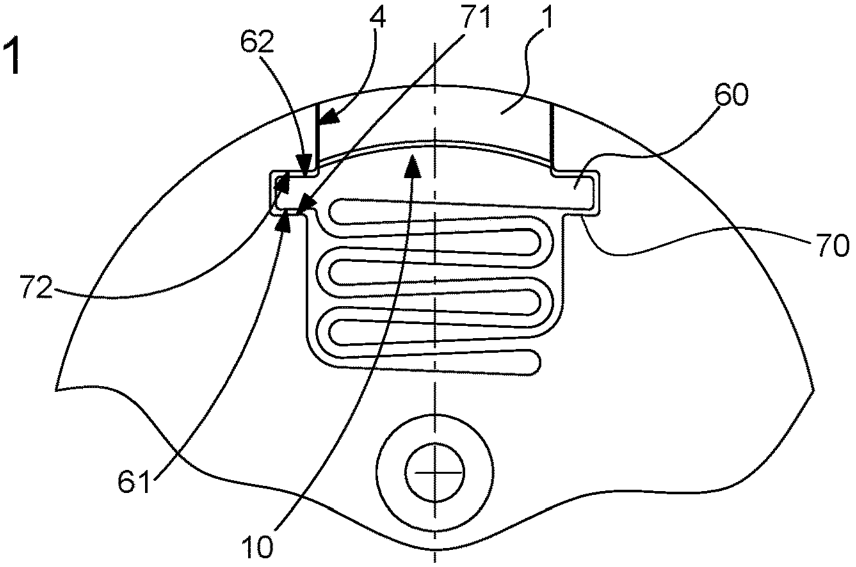
FIG. 11 represents, schematically and in plan view, a detail of the cooperation by stops between the mobile jaw here including posts and the support here including slots.

In one variant illustrated, as can be seen in FIG. 11, this mobile jaw 1 includes two mobile stop surfaces 6, the first one 61 turned towards the axis D and the other second 62 opposite the axis ID, and the support 2 includes two fixed stop surfaces 7, the first one 71 opposite the axis D and arranged to bear against the radial end-of-travel stop centripetal with the first mobile stop surface 61, and the other second 72 turned towards the axis D and arranged to bear against the radial end-of-travel stop centrifugal with the second mobile stop surface 62.

Figure 2:
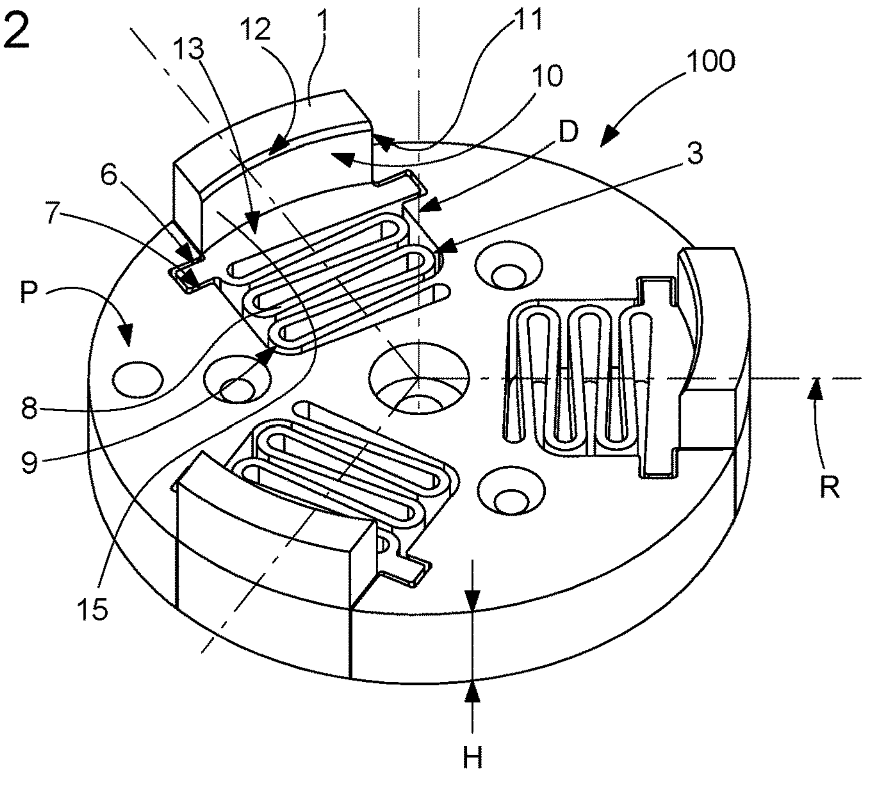
FIG. 2 represents, schematically and in perspective view, a gripper similar to that of FIG. 1; this gripper in a plurality of portions includes a one-piece gripper body including the support, at least one elastic return means, and at least one support sole, supporting a protruding relief, particularly removable, which makes it possible to produce the one-piece gripper body with a constant height H. The protruding relief of the mobile jaw includes, on either side of a bearing surface of the component, particularly a cylindrical surface, a bevelled and/or radiused introduction surface to facilitate the relative insertion of a component into or onto the gripper, or vice versa, and a front stop surface, which is arranged to cooperate axially bearing with a component to stop it in a precise axial position.
Figure 12:
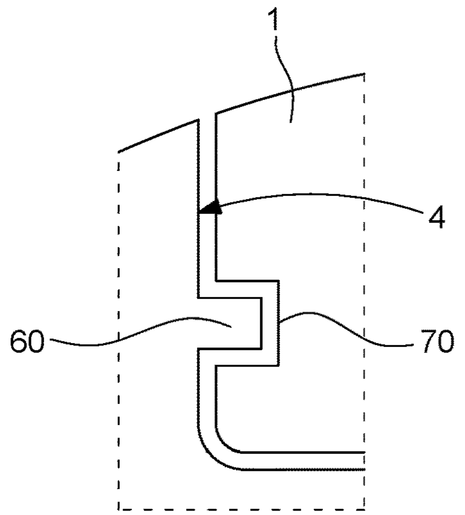
FIG. 12 represents, schematically and in plan view, a detail of the cooperation by stops between the mobile jaw here including slots and the support here including posts.

More particularly, the mobile stop surfaces 6 are supported by a post 60 included in the mobile jaw 1, and the fixed stop surfaces 7 are those of a slot 70 included in the support 2, as can be seen particularly in FIGS. 1, 2, 11, or vice versa as can be seen in FIG. 12.

In an advantageous implementation, the mobile stop surfaces 6 and the fixed stop surfaces 7 are arranged to cooperate in the general plane P.

In one variant illustrated particularly in FIGS. 1 and 11, at least one such mobile jaw 1, and more particularly each mobile jaw 1, which is suspended by at least one elastic return means 3 on the support 2, is guided in a guide slot 4 included in this support 2.

More particularly, the guiding of the mobile jaw 1 in this guide slot 4 is then strictly radial in relation to the axis D.

In an advantageous variant, at least one elastic return means 3, preferably all of the radial elastic return means has(have), in the general plane P wherein the radial elastic return means extend, the shape of a serpent with an elastic strip 8 forming zig-zag loops 9 about a radial R from the axis D. In other terms, the strip is in a zig-zag due to the fact that it defines a winding longitudinal line. FIGS. 1, 2, 7 and 11 illustrate a configuration where the elastic return means 3 have this serpent/zig-zag shape.

Figure 10:
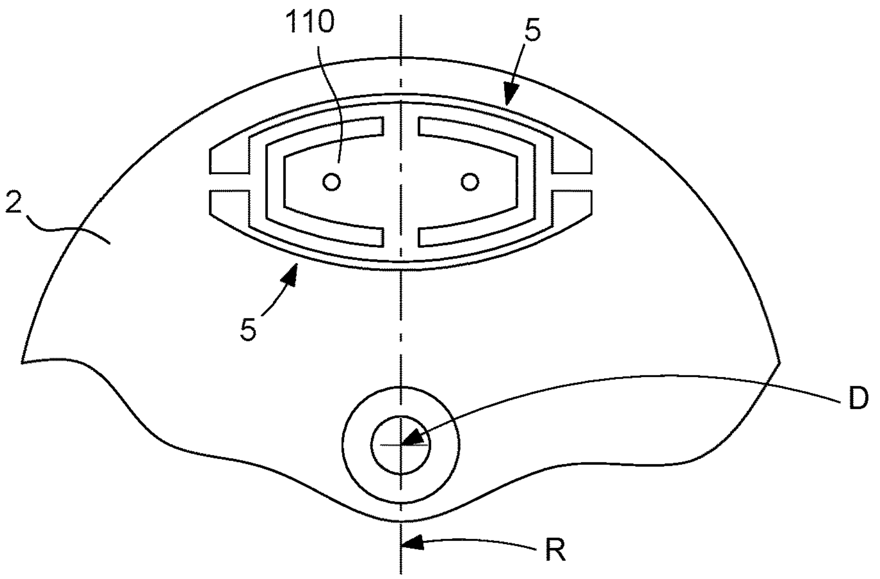
FIG. 10 represents, schematically and in plan view, a detail of another embodiment of gripper in a plurality of portions, where the suspension of the sole of the mobile jaw is ensured by areas with radial elastic deformability located radially on either side of this sole.

FIG. 10 illustrates another advantageous variant, wherein at least one area with radial elastic deformability 5 has, in the general plane P, a succession of pockets separated by relatively thin flexible strips, in symmetry about a radial plane passing through the axis D and by a radial R from the axis D.

Advantageously, in the case of a strip 8 in serpent/zig-zag shape, this strip 8 is of variable section. Even more particularly, the loops 9 are narrower according to the radial R than their lateral edges 91, 92, distant from the radial R, and are each closer to the following and/or the preceding in the vicinity of the lateral edges 91, 92, than their middle portion 93 located on the radial R.

Advantageously, at least one jaw 1 is a jaw 1 radially movable in relation to the axis D, and more particularly each jaw 1, is such a jaw 1 radially movable in relation to the axis D.

More particularly, all of the elastic return means 3, and areas with radial elastic deformability 5, included in the gripper 100, are arranged such that the resultant at the axis D of the forces applied by the jaws 1 on the component 200 is zero. In one variant illustrated, three identical elastic return means 3 are disposed at 120°. In another variant, a whole number N of elastic return means 3, or of areas with radial elastic deformability 5, identical, are separated by angles with equal centres of value 360°/N in relation to the axis D. In other variants, elastic return means 3, or areas with radial elastic deformability 5, identical, are disposed in axial symmetry two by two in relation to the axis D. Other variants may also combine these various configurations.

To facilitate the insertion of a gripper 100 onto or into a component 200, advantageously at least one jaw 1, and more particularly each jaw 1 of this gripper 100, includes at least one relief 11, which is protruding in relation to the support 2 at a first axial side of the gripper 100, said insertion side, arranged for placing in cooperation the gripper 100 and of a timepiece component 200, and includes therein, at a distal end, at least one bevelled and/or radiused introduction surface 12 to facilitate the insertion of a said timepiece component 200 into or onto the gripper 100, or of the gripper 100 onto or into a timepiece component 200. In particular, such an introduction surface 12 is a chamfer very slightly sloped, for example according to an angle of 15° to 35° over a height of a few tens of millimetres.

Figure 3:
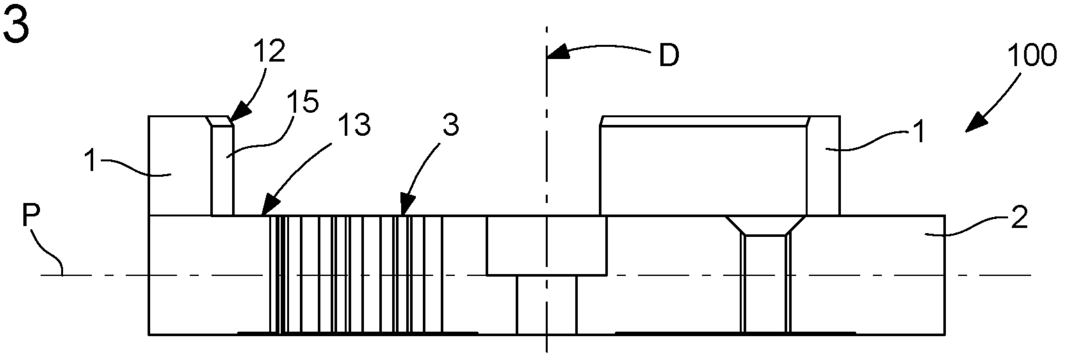
FIG. 3 represents, schematically and in sectional view, the one-piece gripper of FIG. 1, according to the sectional line AA of this figure, the mobile jaw is designed for an external clamping of the component to be held and/or to be manipulated.
Figure 4:
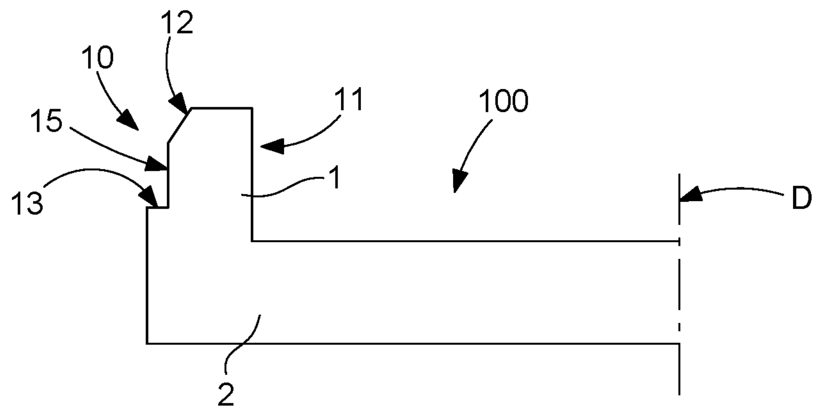
FIG. 4 represents, in a similar way to FIG. 3, a variant of the one-piece gripper of FIG. 1, wherein the mobile jaw is designed for an internal clamping of the component to be held and/or to be manipulated.
Figure 5:
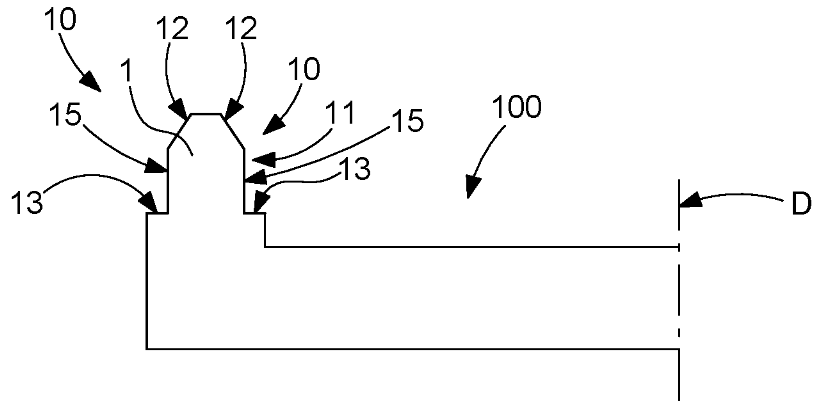
FIG. 5 represents, in a similar way for FIGS. 3 and 4, a variant of the one-piece gripper of FIG. 1, wherein the mobile jaw is designed for an internal or external clamping of the component to be held and/or to be manipulated.
Figure 6:
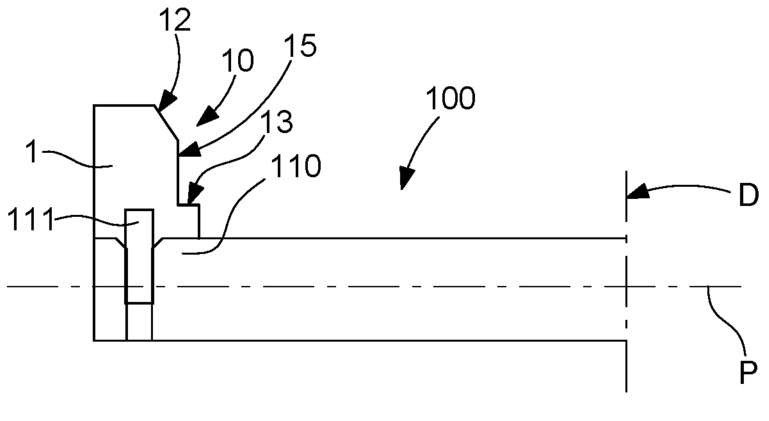
FIG. 6 represents, schematically and in sectional view, the gripper in a plurality of portions of FIG. 2, where the mobile jaw is designed for an external clamping of the component to be held and/or manipulated; this mobile jaw includes a removable protruding relief assembled on a sole integral with the one-piece support block, here by pins.
Figure 7:
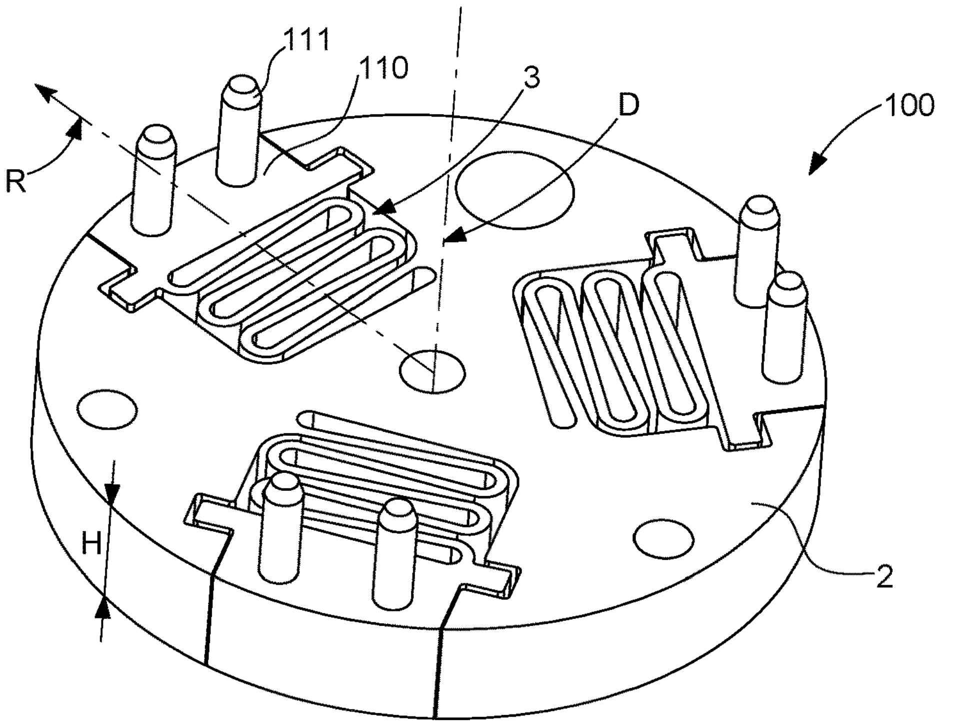
FIG. 7 represents, schematically and in perspective view, the gripper of FIGS. 2 and 6, of which the protruding relief of the mobile jaw is not mounted, two pins protruding from a sole are disposed to receive this attached protruding relief.

Indeed, it is understood that the component 200 may be solid, with holding from the outside in the configuration of FIG. 3, or annular or similar, with holding from the inside in the configuration of FIG. 4. The gripper 100 may also be versatile as in FIG. 5, for external or internal holding of a component 200.

At least one jaw 1, and preferably each jaw 1, includes a front stop surface 13, arranged to cooperate axially bearing with a component 200 to stop it in a precise axial position according to the axis D.

The bearing surface 10 is advantageously a bearing surface 15 parallel to the axis D, particularly in the form of a cylindrical sector.

Figure 8:
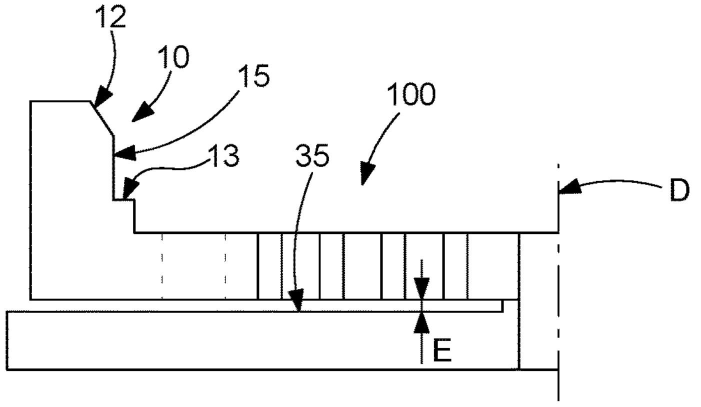
FIG. 8 represents, schematically in sectional view passing through the axis, another gripper in a plurality of portions, where the support is broken down into two plates, one upper supporting the mobile jaw and including the elastic return means, and the other lower, fixed to the preceding one, and including a limit surface, at a non-zero distance from the mobile jaw suspension elastic return means, to prevent any permanent deformation and any breakage of such an elastic return means.
Figure 9:
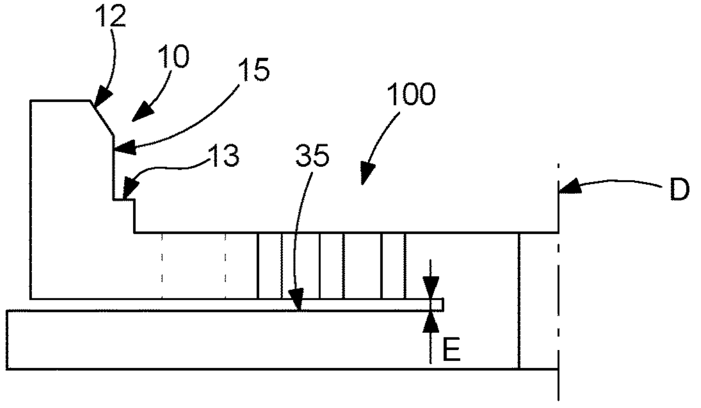
FIG. 9 represents, schematically and in sectional view passing through the axis, another one-piece gripper, which includes a limit surface, at a non-zero distance from the mobile jaw suspension elastic return means, to prevent any permanent deformation and any breakage of such an elastic return means.

In a particular configuration that can be seen in FIGS. 8 and 9, the gripper 100 includes, in a plane parallel to the plane P, a limit surface 35 on the side opposite the jaws, and more particularly to the protruding reliefs 11, in relation to at least one elastic return means 3, and more particularly each elastic return means 3, or in relation to at least one area with radial elastic deformability 5, and more particularly each area with radial elastic deformability 5, included in the gripper. This limit surface 35 is preferably distant from this at least one said elastic return means 3, and more particularly from each elastic return means 3, or from this at least one area with radial elastic deformability 5, and more particularly from each area with radial elastic deformability 5, of a non-zero spacing value E, to allow a slight bending according to the axis D, of this at least one elastic return means 3, and more particularly of each elastic return means 3, or of this at least one said area with radial elastic deformability 5, and more particularly of each area with radial elastic deformability 5, during the insertion of a timepiece component 200 into or onto the gripper 100, or during the insertion of the gripper 100 onto or into a timepiece component 200, by limiting the axial friction. This spacing value E is limited to a predetermined threshold value, for each type of gripper 100, to prevent any permanent deformation and any breakage of an elastic return means 3, and more particularly of each elastic return means 3, or of an area with radial elastic deformability 5, and more particularly each area with radial elastic deformability 5.

In a particular implementation, the gripper 100 is one-piece. This gripper 100 may be made of a metal material, such as a stainless steel, a spring steel, or another alloy, and machined, particularly in respect to the elastic return means 3 and/or the areas with radial elastic deformability 5 that it includes, by wire electroerosion and/or by sinking; such an implementation is well suited to the holding of solid components 200, with a high clamping force, and high stiffness elastic return means. A gripper 100 of diameter 40 mm, with three serpent springs at 120° of 0.65 mm of the smallest section, made of 1.4301 or 1.4310 stainless steel, with a support of height 6 mm, for the gripping of a component of diameter 34 mm; thus has a stiffness per jaw between 25 N/mm and 45 N/mm, more particularly between 30 N/mm and 40 N/mm. The axial thrust, according to the type of component 200 to be manipulated, may be adjusted to a value between 6 N and 30 N for its insertion into the jaws.

For the gripping of components 200 of more delicate nature, the gripper 100 may be produced by stereolithography, by a "LIGA", "DRIE" or similar method, and in particular made of nickel, nickel-phosphorus, silicon and/or at least one silicon oxide, or made of an amorphous or at least partially amorphous material; naturally, the clamping force applied here is very low, as well as the radial travel of the jaws; such a gripper constitutes a good solution for manipulating or holding very fragile components 200, for example for mounting inertia blocks on a balance.

The figures that represent the gripper 100 equipped with elastic return means 3 consisting of serpent springs shows them in the operating position of the gripper, with these serpent springs stretched and stopped by the cooperation of posts with slots. These grippers are produced in the free state with each serpent spring extending radially in a guide slot 4, with its distal end beyond the support 2; the serpent spring is subsequently compressed out of plane, up to a radial holding position by the post-slot system. In the non-limiting example illustrated in FIGS. 1, 2, 7, 11, the radial extension of the serpent spring in the free state is between 2.5 times and 4.0 times its radial extension in the compressed state, and particularly between 3.1 times and 3.5 times its radial extension in the compressed state. The radial extension of the serpent spring in the compressed state is between times and 0.24 times the maximum diameter of the support 2, more particularly between 0.15 times and 0.19 times the maximum diameter of the support.

More particularly the section (smallest dimension) of the strip 8 is between 0.090 times and 0.126 times its own height, more particularly between 0.103 times and 0.113 times its own height.

More particularly the section of the strip 8 is between 0.090 times and 0.126 times the height of the support 2, more particularly between 0.103 times and 0.113 times the height of the support 2.

More particularly, the section of the strip 8 is between 0.175 times and 0.211 times the maximum diameter of the largest component 200 to be grasped, more particularly between 0.185 times and 0.201 times the maximum diameter of this largest component 200. The bearing against the post-slot assembly in a direction perpendicular to a radial, or against any other equivalent mechanism, is important in order to avoid any angular deformation of the jaw 1 and of its elastic return means. The embodiments illustrated guarantee a deformation only in the radial direction, which ensures optimum holding of the component 200.

In an advantageous embodiment, at least one jaw 1, and more particularly each jaw 1, of the gripper 100 includes at least one relief 11 protruding in relation to the support 2 at the insertion side, and this protruding relief 11 is removable and attached on a one-piece gripper body including the support 2, at least one elastic return means 3, and more particularly each elastic return means 3, or at least one area with radial elastic deformability 5, and more particularly each area with radial elastic deformability 5, and a support sole 110, which includes assembly means arranged to cooperate with complementary assembly means 111, such as pins or similar, included in a protruding relief 11. Other pins, or similar positioning elements, may be mounted on the gripper 100 for adjusting the position of the component. This arrangement makes it possible to produce the one-piece gripper body with a constant height H, which considerably facilitates its production and makes it possible to produce the gripper 100 with a lower manufacturing cost.

The figures show a highly versatile particular case of a gripper 100 making it possible to clamp a component 200, of round shape, by three jaws 1 angularly offset by 120° and deforming in the elastic domain. The principle can be adapted to various washer diameters. For example, for a component of diameter 34 mm, the travel per jaw is advantageously of +/−0.2 mm; a clearance of 0.1 mm may already be sufficient. Thus, the stops making possible a travel of each jaw of 0.2 mm, or +/−0.1 mm are suitable for many timepieces to be held in order to machine them. This is clearly within the conventional tolerances for blanks of the horological type to be machined also with such a travel/such a clearance.

The stops avoid too much movement of the jaw, and therefore its breakage or those of the elastic elements 3, 5, included in the gripper. The particular implementation of an elastic return element in the form of a serpent spring allows the gripping of components of inconstant diameter without energy contribution. In addition, the mechanism requires no maintenance, and possesses a very long life, comparable to that of the manipulators intended to incorporate such grippers.

This gripper forming a clamp does not require energy, apart from the axial thrust of the component into the jaws, which corresponds to a movement that is in any case implemented by the manipulator or by the production machine. This solution is economical, and has in addition the advantage of being able to be implemented in a small size.

The choice of the material of the gripper is related to the nature of the components to be manipulated or to be held, and to their resistance. The use of stainless steels such as 1.4301, 1.4310, or of spring steels is well suited to solid blank parts, plates, oscillating masses, and similar. The use of grippers made of less dense materials, “Nylon” or other, can be envisaged for components with small sections.

An arrangement of the one-piece gripper body including the support, the elastic return means, and a support sole for supporting the removable protruding reliefs makes it possible to significantly simplify the machining, and to have a significant freedom of design of the shape of the protruding reliefs of the jaws.

One advantageous aspect of the invention resides in the arrangement of the spring in the plane of the base of the clamp forming the gripper. The particular concept of the invention may be summarised as the production of a jaw on a support having a radial elastic deformability.

It should be noted that a clearance of 0.1 mm may be sufficient to exert a sufficient radial force. Everything depends on the elastic constant of the spring: the constant k of the spring is chosen depending on the application and on the radial force of the required gripping.

Many variants are conceivable:

The axial stop surface 13 may be, either integrated into a one-piece sub-assembly, or separate in the form of an attachment;

The principle of the invention is applicable to an axial stop system, instead of the radial stop system specific to the invention.

The invention also relates to a manipulator 1000 for extracting a timepiece component 200 from a production or conveyor station 500, 600, and particularly from a fitting 510 included in this production or conveyor station 500, 600, or its deposit on such a production or conveyor station 500, 600.

The manipulator 1000 includes at least one such gripper 100, and this manipulator 1000 includes means, particularly motorised, to take at least one gripper 100, and more particularly each gripper 100, towards a timepiece component 200 in the direction of the field of gravity, axially thrust according to the axis D the gripper 100 onto or into the timepiece component 200 by elastically deforming at least one said elastic return means 3, and more particularly each elastic return means 3, or at least one said area with radial elastic deformability 5, and more particularly each area with radial elastic deformability 5, of this gripper 100 up to an axial stop position, and release the gripper 100 elastically holding the timepiece component 200 in order to transport it towards another production or conveyor station 600, at which the manipulator 1000 is arranged to radially cooperate with an ejection means, particularly and non-limitingly an ejector finger 650, included in this other production or conveyor station 600 or the manipulator 1000 itself, for a radial insertion of this ejection means, particularly of this ejector finger 650, between the support 2 and the timepiece component 200 to allow the deposit of the timepiece component 200 on a receptacle or a fitting included in this other production or conveyor station 600.

Figure 13:
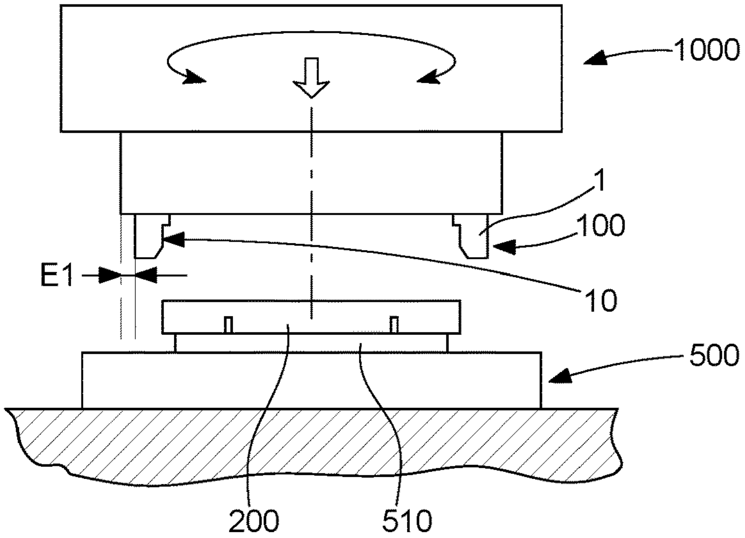
FIGS. 13 to 18 illustrate, schematically and in side view, the steps of a transfer, carried out by a manipulator, including a gripper according to the invention, for extracting a timepiece component from a first production or conveyor station, and particularly from a first fitting, towards another production or conveyor station.
Figure 14:
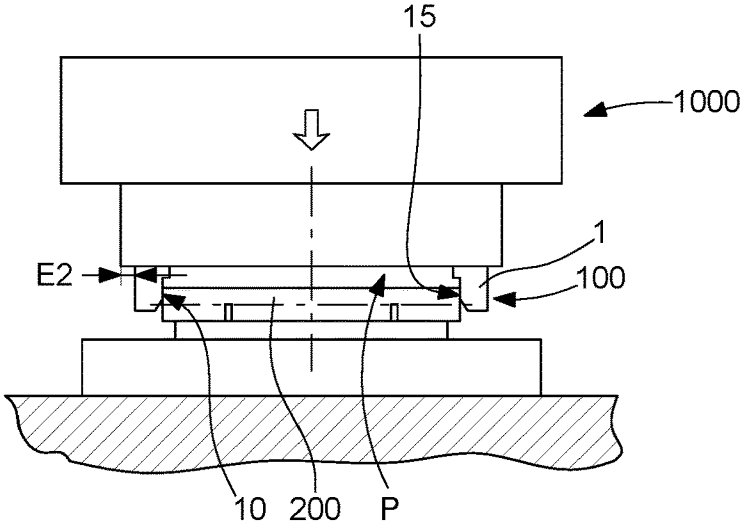
Figure 15:
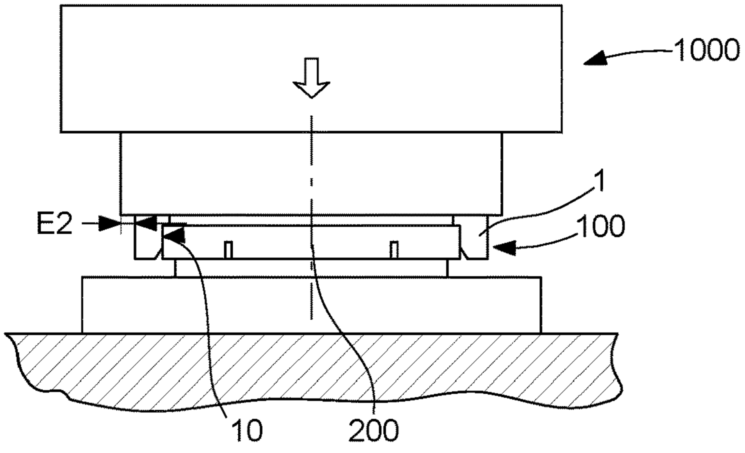
Figure 16:
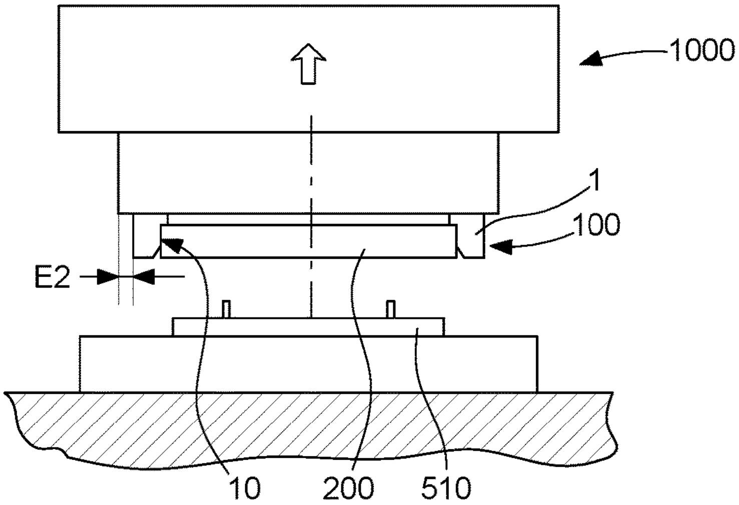
Figure 17:
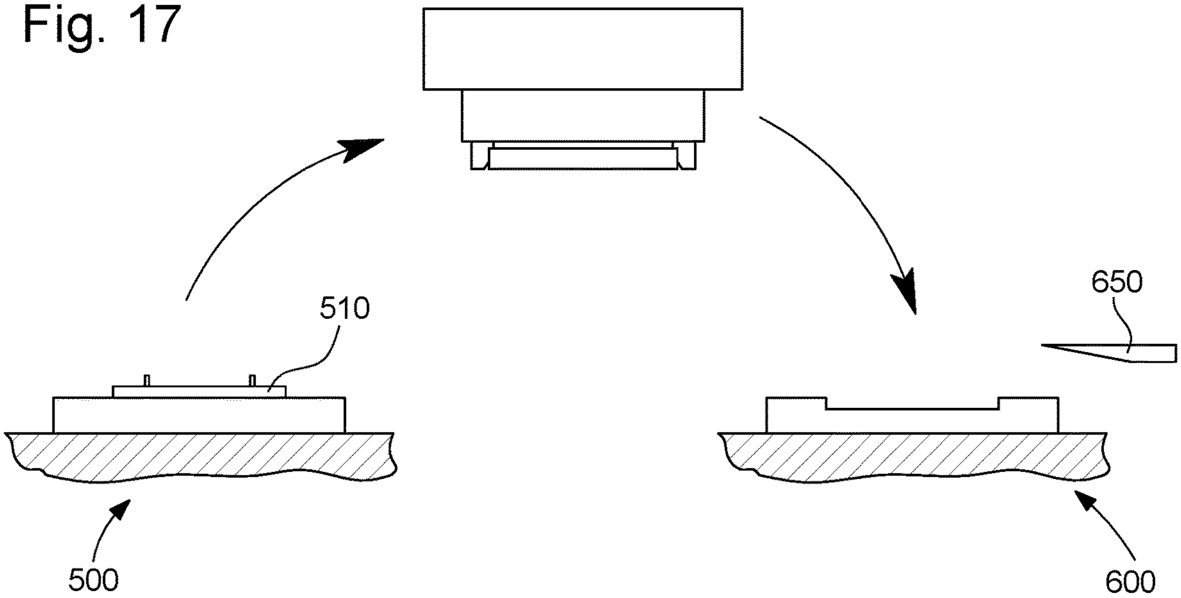
Figure 18:
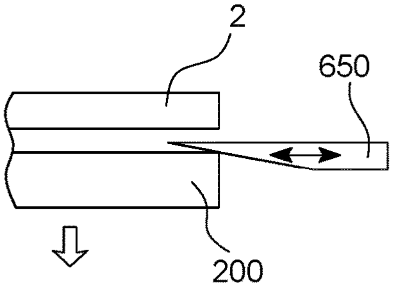

FIGS. 13 to 18 illustrate the steps of this transfer:

FIG. 13: downward approach of the gripper 100 with its jaws 1 in a minimum radial eccentric position E1, towards the component 200 held on a fitting 510 of the first production or conveyor station 500;

FIG. 14: relative thrust between the jaws 1 and the component 200, guided on the insertion surfaces 12 and bearing against the bearing surfaces 15 parallel to the axis ID, FIG. 15: axial stop positioning of the component 200 in the jaws 1 in a maximum radial eccentric position E2;

FIG. 16: release of the gripper 100, and separation of the component 200 detached from the fitting 510 that supported it until then;

FIG. 17: transfer of the gripper 100 towards the other production or conveyor station 600;

FIG. 18: ejection of the component 200.

The invention claimed is:

1. A gripper with radial clamping, for a timepiece component, including a plurality of jaws distributed about an axis, which defines a direction of insertion and/or of extraction for the timepiece component, and connected to a support of the gripper, each jaw of the plurality of jaws including a bearing surface arranged to ensure a radial contact, relative to said axis, with a counter surface of said component and to be able to apply on this counter surface a radial clamping force, each jaw being radially movable in relation to said axis and having an essentially radial travel in relation to this axis, wherein each jaw is connected to said support by a respective radial elastic return means that extends in a general plane perpendicular to said axis.

2. The gripper according to claim 1, wherein said radial elastic return means is arranged between the mobile jaw connecting said radial elastic return means to said support and said axis.

3. The gripper according to claim 1, wherein said support also extends in said general plane.

4. The gripper according to claim 2, wherein said support also extends in said general plane.

5. The gripper according to claim 1, wherein said essentially radial travel in relation to said axis is provided in an elastic deformation range of said radial elastic return means and is defined by the cooperation between mobile stop surfaces included in each jaw and fixed stop surfaces included in said support.

6. The gripper according to claim 5, wherein each jaw includes two said mobile stop surfaces, the first one turned towards said axis and the other second opposite said axis, and wherein said support includes two said fixed stop surfaces, the first one opposite said axis and arranged to bear against the radial end-of-travel stop centripetal with said first mobile stop surface, and the other second turned towards said axis and arranged to bear against the radial end-of-travel stop centrifugal with said second mobile stop surface.

7. The gripper according to claim 5, wherein said mobile stop surfaces are supported by a post included in each jaw, and wherein said fixed stop surfaces are those of a slot included in said support, or vice versa.

8. The gripper according to claim 1, wherein each jaw is guided in a guide slot included in said support.

9. The gripper according to claim 8, wherein the guiding of each jaw in said guide slot is strictly radial in relation to said axis.

10. The gripper according to claim 1, wherein said radial elastic return means has, in projection over said plane, a shape of a serpent with a strip forming zig-zag loops about a radial from said axis.

11. The according to claim 10, wherein said strip has a variable section.

12. The gripper according to claim 1, wherein each jaw of said gripper includes a relief protruding in relation to said support at a first axial side of said gripper, said insertion side, arranged for placing in cooperation said gripper and a said timepiece component, and includes therein, at a distal end, at least one bevelled and/or radiused introduction surface to facilitate the insertion of a timepiece component into or onto the gripper or of the gripper onto or into the timepiece component.

13. The gripper according to claim 12, wherein the gripper includes, in a plane parallel to said general plane, a limit surface located on the side opposite the protruding relief of each jaw, in relation to said general plane, and distant from said radial elastic return means of each jaw of a non-zero spacing value, limited by the limit surface, to allow a slight axial bending according to said axis of this radial elastic return means during the insertion of said timepiece component into the gripper, or of the gripper onto said timepiece component, thus by limiting an axial friction, said spacing value being limited to a predetermined threshold value to prevent any permanent deformation of said radial elastic return means.

14. The gripper according to claim 1, wherein the gripper is one-piece.

15. The gripper according to claim 12, wherein said protruding relief is removable and attached on a one-piece gripper body extending in said general plane and including said support, said radial elastic return means and a support sole, this support sole comprising or being associated with assembly means arranged to cooperate with complementary assembly means included in said protruding relief.

16. The gripper according to claim 1, wherein the radial clamping force of each jaw is generated by a return force of the radial elastic return means connecting said jaw to the support.

* * * * *